US012748614B2

(12) United States Patent
Imamoto et al.

(10) Patent No.: US 12,748,614 B2
(45) Date of Patent: Sep. 29, 2026

(54) INFORMATION PROCESSING APPARATUS AND INFORMATION PROCESSING METHOD

(71) Applicant: Panasonic Intellectual Property Management Co., Ltd., Osaka (JP)

(72) Inventors: Yoshiharu Imamoto, Kanagawa (JP); Jun Anzai, Kanagawa (JP); Toshihisa Nakano, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 450 days.

(21) Appl. No.: 18/236,819

(22) Filed: Aug. 22, 2023

(65) Prior Publication Data

US 2023/0401083 A1 Dec. 14, 2023

Related U.S. Application Data

(63) Continuation of application No. PCT/JP2021/047509, filed on Dec. 22, 2021.

(30) Foreign Application Priority Data

Feb. 26, 2021 (JP) ................................ 2021-029959

(51) Int. Cl.
*G06F 9/455* (2018.01)

(52) U.S. Cl.
CPC .................... *G06F 9/45558* (2013.01); *G06F 2009/45587* (2013.01); *G06F 2009/45591* (2013.01)

(58) Field of Classification Search
CPC ....... G06F 9/45558; G06F 2009/45587; G06F 2009/45591
See application file for complete search history.

(56) References Cited

U.S. PATENT DOCUMENTS 8,239,526 B2 * 8/2012 Simpson ................. H04L 43/08 709/224
8,364,460 B2 * 1/2013 Ostermeyer ........ G06F 9/45558 718/1
9,632,812 B1 * 4/2017 Gritter ................ H04L 67/1095
10,204,219 B2 2/2019 Harel et al.
(Continued)

FOREIGN PATENT DOCUMENTS

JP 10-214208 8/1998
JP 2005-284686 10/2005
WO WO-2017186412 A1 * 11/2017 ............. G06F 21/55

OTHER PUBLICATIONS

International Search Report (ISR) from International Searching Authority (Japan Patent Office) in International Pat. Appl. No. PCT/JP2021/047509, dated Feb. 8, 2022, together with an English language translation.

*Primary Examiner* — Lewis A Bullock, Jr.
(74) *Attorney, Agent, or Firm* — Greenblum & Bernstein, P.L.C.

(57) ABSTRACT

An ECU (Electronic Control Unit) includes a HV (Hyper-Visor), and a first VM (Virtual Machine) and a second VM that operate on the HV. The first VM detects an abnormality in a process in the first VM. When the first VM detects an abnormality, the first VM notifies the second VM of information related to the abnormality via the HV. The second VM executes a process responsive to the abnormality, based on the information related to the abnormality provided from the first VM.

7 Claims, 6 Drawing Sheets

(56) References Cited

U.S. PATENT DOCUMENTS

| | | | | |
|---|---|---|---|---|
| 11,023,574 | B2 | 6/2021 | Harel et al. | |
| 11,442,768 | B2 * | 9/2022 | Kumar | G06F 3/0604 |
| 2010/0125665 | A1 * | 5/2010 | Simpson | G06F 11/3466 718/1 |
| 2011/0239038 | A1 * | 9/2011 | Ito | G06F 11/1484 714/E11.071 |
| 2012/0303805 | A1 * | 11/2012 | Simpson | G06F 9/45558 709/224 |
| 2013/0305092 | A1 * | 11/2013 | Jayachandran | G06F 11/3495 714/E11.029 |
| 2013/0318235 | A1 * | 11/2013 | Simpson | G06F 11/3409 709/224 |
| 2014/0122941 | A1 * | 5/2014 | Pan | G06F 11/1484 714/45 |
| 2017/0185445 | A1 * | 6/2017 | Liu | G06F 9/45558 |
| 2017/0300394 | A1 * | 10/2017 | Raut | G06F 11/203 |
| 2018/0239896 | A1 * | 8/2018 | Kato | G06F 12/14 |
| 2018/0309770 | A1 * | 10/2018 | Han | G06N 20/00 |
| 2018/0349598 | A1 | 12/2018 | Harel et al. | |
| 2019/0156022 | A1 | 5/2019 | Harel et al. | |
| 2019/0171585 | A1 * | 6/2019 | Yonemura | G06F 21/78 |
| 2019/0197234 | A1 | 6/2019 | Harel et al. | |
| 2021/0019170 | A1 * | 1/2021 | Sugano | G06F 11/07 |
| 2021/0209223 | A1 * | 7/2021 | Mukherjee | G06F 9/45558 |
| 2021/0349991 | A1 | 11/2021 | Harel et al. | |
| 2022/0229679 | A1 * | 7/2022 | Mutha | G06F 9/45558 |
| 2023/0394149 | A1 * | 12/2023 | Tamura | G06F 9/45558 |
| 2024/0103895 | A1 * | 3/2024 | Mutha | G06F 9/45558 |

* cited by examiner

FIG. 5

| ABNORMALITY SCORE | HANDLING METHOD |
|---|---|
| LESS THAN FIRST THRESHOLD VALUE (e. g., LESS THAN 1) | · RESTART CALLING App PROCESS<br>· DO NOT REPORT SECURITY INCIDENT |
| GREATER THAN OR EQUAL TO FIRST THRESHOLD VALUE AND LESS THAN SECOND THRESHOLD VALUE (e. g., NOT LESS THAN 1 AND LESS THAN 2) | · RESTART CALLING App PROCESS<br>· SAVE DATA + REPORT SECURITY INCIDENT |
| GREATER THAN OR EQUAL TO SECOND THRESHOLD VALUE (e. g., GREATER THAN OR EQUAL TO 2) | · ABORT EXECUTION OF CALLING App PROCESS<br>· SAVE DATA + REPORT SECURITY INCIDENT |

INFORMATION PROCESSING APPARATUS AND INFORMATION PROCESSING METHOD

BACKGROUND

1. Field

The present disclosure relates to data processing technologies and, in particular, information processing apparatuses and information processing methods.

2. Description of the Related Art

Various memory protection technologies have been proposed to deal with risks of unauthorized seizure of system rights by attacks that exploit software vulnerabilities. Examples of such protection technologies include StackCanary, CFI (Control Flow Integrity), and DEP (Data Execution Prevention). Patent literature 1 below proposes a technology for checking whether a function call returns to a whitelisted address and preventing a jump to an address that is not predefined.

[Patent literature 1] US2018/0349598

In the technology of Patent literature 1, abnormal function jumps can be prevented. However, there is a disadvantage in that, when the technology is applied to a program operating in a privileged layer such as an OS (Operating System), the function responsive to an abnormality can similarly be under attack so that a stable abnormality respondent process cannot be guaranteed.

SUMMARY

The present disclosure addresses the issue described above, and a purpose thereof is to provide a technology that realizes a stable abnormality respondent process responsive to an abnormality occurring in a system.

An information processing apparatus according to an aspect of the present disclosure is an information processing apparatus in which a first VM (Virtual Machine) and a second VM operate on a HV (HyperVisor), wherein the first VM includes: a detection unit that detects an abnormality in a process in the first VM; and a notification unit that, when the detection unit detects an abnormality, notifies the second VM of information related to the abnormality via the HV. The second VM includes: a respondent unit that executes a process responsive to the abnormality, based on the information related to the abnormality provided from the first VM.

Another aspect of the present disclosure also relates to an information processing apparatus. The apparatus is an information processing apparatus in which a HV and a secure OS operate on a secure monitor, and one or more VMs operate on the HV, wherein the HV includes: a detection unit that detects an abnormality in a process in the HV; and a notification unit that, when the detection unit detects an abnormality, notifies the secure OS of information related to the abnormality via the secure monitor. The secure OS includes: a respondent unit that executes a process responsive to the abnormality, based on the information related to the abnormality provided from the HV.

Still another aspect of the present disclosure relates to an information processing method. The method is an information processing method executed by a computer in which a first VM and a second VM operate on a HV, including: detecting, using the first VM, an abnormality in a process in the first VM, and notifying, when an abnormality is detected, the second VM of information related to the abnormality via the HV, and executing, using the second VM, a process responsive to the abnormality, based on the information related to the abnormality provided from the first VM.

Yet another aspect of the present disclosure also relates to an information processing method. The method is an information processing method executed by a computer in which a HV and a secure OS operate on a secure monitor, and one or more VMs operate on the HV, including: detecting, using the HV, an abnormality in a process in the HV, and notifying, when an abnormality is detected, the secure OS of information related to the abnormality via the secure monitor, and executing, using the secure OS, a process responsive to the abnormality, based on the information related to the abnormality provided from the HV.

Optional combinations of the aforementioned constituting elements, and implementations of the present disclosure in the form of systems, computer programs, recording mediums encoded with computer programs, and vehicles carrying an information processing apparatus may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows the detail of a respondent process for each anomaly score; and

DETAILED DESCRIPTION OF THE EMBODIMENTS

Figure 1:
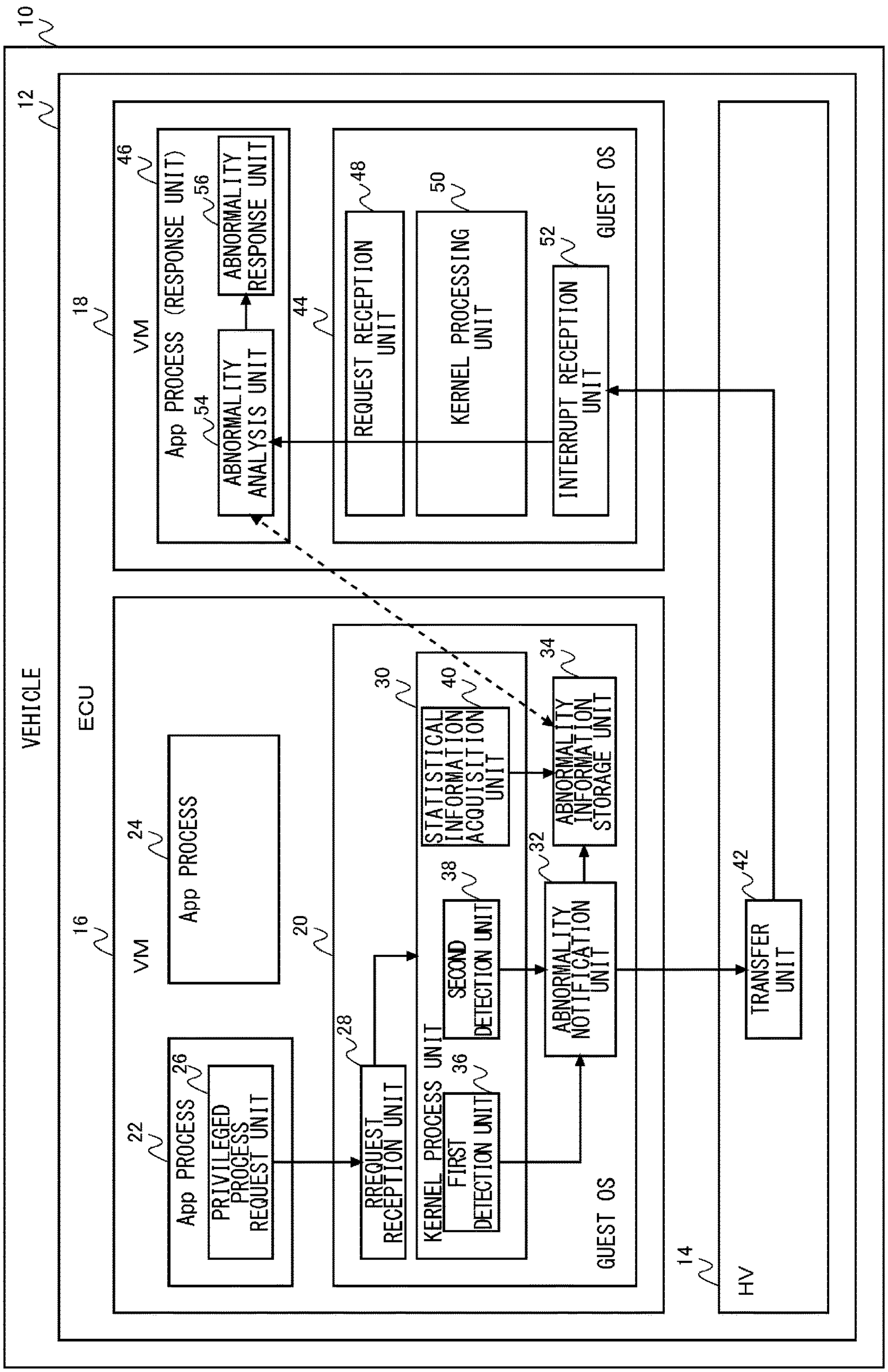
FIG. 1 is a block diagram showing functional blocks provided in the ECU of the exemplary embodiment.

The invention will now be described by reference to the preferred embodiments. This does not intend to limit the scope of the present invention, but to exemplify the invention.

The device or the entity that executes the method according to the disclosure is provided with a computer. By causing the computer to run a program, the function of the device or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The terms IC and LSI may change depending on the level of integration, and the processor may be comprised of a system LSI, a Very Large Scale Integration (VLSI), or an Ultra Large Scale Integration (ULSI). A field programmable gate array (FPGA), which is programmed after an LSI is manufactured, or a reconfigurable logic device, in which connections inside the LSI can be reconfigured or circuit compartments inside the LSI can be set up, can be used for the same purpose. The plurality of electronic circuits may be integrated in one chip or provided in a plurality of chips. The plurality of chips may be aggregated in one device or provided in a plurality of apparatuses. The program may be recorded in a non-transitory recording medium such as a computer-readable read only memory (ROM), optical disk, and hard disk drive or recorded in a non-transitory storage medium. The program may be stored in a recording medium in advance or supplied to a recording medium via a wide area communication network including the Internet.

A summary of an exemplary embodiment will be given before. Conventionally, a technology to protect software from attacks that exploit software vulnerabilities (for example, memory protection technology to prevent abnormal function jumps) has been proposed. However, there is a disadvantage in that, when such conventional technology is applied to a program operating in a privileged layer such as an OS, the function responsive to an abnormality can similarly be under attack so that a stable abnormality respondent process cannot be guaranteed. In the information processing apparatus (ECU 12 described later) of the exemplary embodiment, a stable abnormality respondent process in response to an abnormality occurring in a system is realized by isolating the entity executing an abnormality respondent process from the entity detecting an abnormality and, further, isolating a detection result of the memory protection technology from a protected program.

In addition, various data related to abnormalities (hereinafter also referred to as "abnormality information") must be collected and provided outside for analysis in order to fix software vulnerabilities. Since the size of management data is large in system software such as OS, it is necessary to collect and provide abnormality information efficiently. The information processing apparatus (ECU 12 described later) of the exemplary embodiment realizes efficient collection and provision of abnormality information by scoring the degree of abnormality when an abnormality is detected.

Details of the exemplary embodiment will be described. FIG. 1 is a block diagram showing functional blocks provided in the ECU (Electronic Control Unit) 12 of the exemplary embodiment. The ECU 12 is a microcontroller mounted on a vehicle 10. The ECU 12 may be, for example, an integrated ECU that provides a TCU (Telematics Communication Unit) function (for example, a function for communication with an apparatus external to the vehicle 10) and an ADAS (Advanced Driver-Assistance System) function (e.g., collision damage mitigation brake or cruise control).

The blocks shown in the block diagrams of the present disclosure are implemented in hardware such as devices and mechanical apparatus exemplified by a CPU and a memory of a computer, and in software such as a computer program. FIG. 1 depicts functional blocks implemented by the cooperation of those. It will be understood by those skilled in the art that these functional blocks are implemented in a variety of manners by a combination of hardware and software.

For example, a computer program including modules corresponding to at least some of the plurality of functional blocks of the ECU 12 shown in FIG. 1 may be stored in the ROM of the ECU 12. The CPU of the ECU 12 may exhibit the functions of the respective functional blocks shown in FIG. 1 by reading the computer program into a RAM and executing the program.

The ECU 12 includes a hypervisor (HV 14) and a plurality of virtual machines (VM 16 and VM 18) operating on the HV 14. The HV 14 executes processes of allocating various hardware resources provided in the ECU 12 to the VM 16 and the VM 18. The VM 16 is, for example, a VM that provides the TCU function and, in the exemplary embodiments, is the first VM targeted in an attack. The VM 18 is, for example, a VM that provides the ADAS function and, in the exemplary embodiment, is a second VM that analyzes and responds to an abnormality caused by an attack. In addition, the VM 16 and the VM 18 share a memory.

The VM 16 includes a guest OS 20 and processes of a plurality of applications (in the exemplary embodiment, an App process 22 and an App process 24) executed on the guest OS 20. In other words, the program of the guest OS 20 (hereinafter also referred to as "OS program") is executed in the VM 16, and the programs of a plurality of applications are executed in the VM 16 under the management of the guest OS 20.

The App process 22 includes a privileged process request unit 26. The privileged process request unit 26 transmits a privileged process request generated in an application process to the guest OS 20. The privileged process request can be said to be a system call and may request a process of the guest OS 20 (for example, file opening) by calling the API (Application Programming Interface) of the guest OS 20.

The guest OS 20 includes a request reception unit 28, a kernel process unit 30, an abnormality notification unit 32, and an abnormality information storage unit 34. The request reception unit 28 receives the privileged process request transmitted from the App process 22 (privileged process request unit 26). The kernel process unit 30 executes a kernel process (for example, file opening) in response to the privileged process request received by the request reception unit 28. The kernel process unit 30 includes a first detection unit 36, a second detection unit 38, and a statistical information acquisition unit 40.

The first detection unit 36 and the second detection unit 38 detect an abnormality in a process in the VM 16. Specifically, the first detection unit 36 and the second detection unit 38 detect an abnormality in a process (which can be said to be a process in a privileged mode) in the guest OS 20 of the VM 16. The first detection unit 36 and the second detection unit 38 differ from each other in the method of detecting an abnormality. In the exemplary embodiment, the first detection unit 36 detects an abnormality in a process in the guest OS 20 according to a StackCanary mechanism. The second detection unit 38 detects an abnormality in a process in the guest OS 20 according to a CFI mechanism.

Figure 2A:
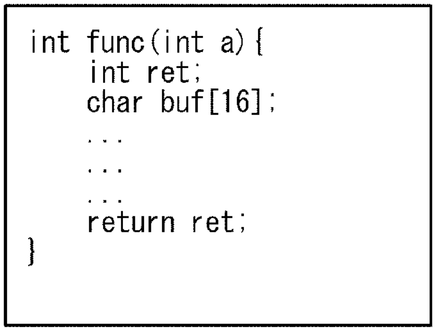
FIG. 2A shows an example of the source code of the OS program.
Figure 2B:
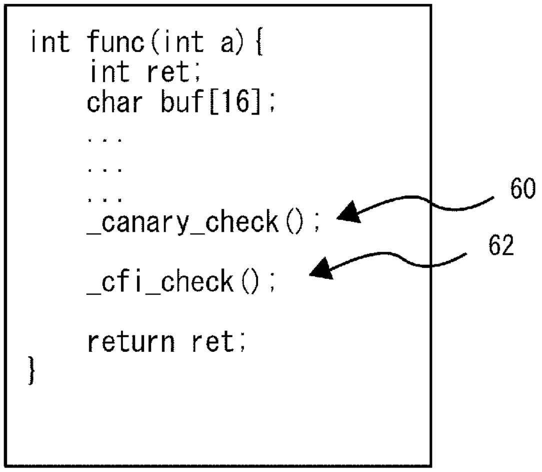
FIG. 2B shows an example of the source code of the OS program to which a check code is added.

FIG. 2A shows an example of a source code of the OS program, and FIG. 2B shows an example of a source code of the OS program to which a check code is added. A check code 60 is a code that calls the StackCanary function, and, when the check code 60 is executed, the abnormality detection process by the first detection unit 36 is executed. A check code 62 is a code that calls the CFI function, and, when the check code 62 is executed, the abnormality detection process by the second detection unit 38 is executed. In the exemplary embodiment, as shown in FIG. 2B, the abnormality detection process (StackCanary) by the first detection unit 36 is executed first, and the abnormality detection process (CFI) by the second detection unit 38 is executed later.

Referring back to FIG. 1, the statistical information acquisition unit 40 acquires statistical information related to a detected abnormality based on the privileged process request from the App process 22. The statistical information acquisition unit 40 stores the acquired statistical information in the abnormality information storage unit 34. The statistical information may include the number and frequency of receipt of privileged process requests by the request reception unit 28, and, in other words, the number and frequency that privileged processes called from the App process 22. Further, the statistical information may include the number and frequency of errors that occurred in association with the privileged process request. The errors may include a format error regarding the number, type, value range, and the like of arguments in the privileged process requests.

When an abnormality is detected by at least one of the first detection unit 36 or the second detection unit 38, the abnormality notification unit 32 acquires various data (abnormality information) related to the abnormality from the kernel process unit 30 and stores the data in the abnormality information storage unit 34. The abnormality information includes the process ID and the process name of the OS program in which the abnormality is detected, the type of detection unit in which the abnormality is detected (in the embodiment, the first detection unit 36 or the second detection unit 38), the register information, the position of and the data for the OS program in which the abnormality is detected, the stack trace data, and the information on the App process that called the OS program in which the abnormality is detected. The abnormality information storage unit 34 stores statistical information and abnormality information related to the detected abnormality.

Further, when an abnormality is detected at least one of the first detection unit 36 or the second detection unit 38, the abnormality notification unit 32 provides information related to the abnormality (hereinafter also referred to as "notification information") to the VM 18 via the HV 14. In the exemplary embodiment, the abnormality notification unit 32 passes notification information to the HV 14 by calling a predetermined API of the HV 14. The notification information of the exemplary embodiment includes data necessary for acquiring the abnormality information stored in the abnormality information storage unit 34. For example, the notification information may include address data indicating the storage position of the abnormality information in the abnormality information storage unit 34.

The HV 14 includes a transfer unit 42. The transfer unit 42 receives the notification information output from the VM 16 (guest OS 20) and transfers the notification information to the VM 18 (guest OS 44).

The VM 18 includes a guest OS 44 and one or more application processes (App process 46 in the exemplary embodiment) running on the guest OS 44.

The guest OS 44 includes a request reception unit 48, a kernel process unit 50, and an interrupt reception unit 52. The request reception unit 48 and the kernel process unit 50 correspond to the request reception unit 28 and the kernel process unit 30 of the guest OS 20. The interrupt reception unit 52 receives the notification information passed by an interrupt from the HV 14 and passes the notification information to the App process 46.

The App process 46 executes, as a respondent unit, a respondent process responsive to the abnormality, based on the information on the abnormality (notification information in the exemplary embodiment) provided from the VM 16. In the exemplary embodiment, the App process 46 executes a respondent process responsive to the abnormality, based on the information on the abnormality in a process in the guest OS 20 acquired from the VM 16. The App process 46 includes an abnormality analysis unit 54 and an abnormality respondent unit 56.

The abnormality analysis unit 54 receives the notification information relating to the abnormality in the guest OS 20 output from the guest OS 20 of the VM 16 and transferred by the HV 14 (transfer unit 42) and the guest OS 44 (interrupt reception unit 52). The abnormality analysis unit 54 reads the abnormality information and the statistical information related to the abnormality from the VM 16 (abnormality information storage unit 34) based on the address data indicated by the notification information. The abnormality analysis unit 54 derives a degree of abnormality based on the abnormality information and the statistical information read from the VM 16 (abnormality information storage unit 34).

When the degree of abnormality derived by the abnormality analysis unit 54 is less than a predetermined threshold, the abnormality respondent unit 56 restarts the process of the application (App process 22 in the exemplary embodiment) that requested the process of the guest OS 20. When the degree of abnormality derived by the abnormality analysis unit 54 is greater than or equal to the above threshold value, on the other hand, the abnormality respondent unit 56 aborts the process of the above application.

Further, when the degree of abnormality derived by the abnormality analysis unit 54 is greater than or equal to a predetermined threshold, the abnormality respondent unit 56 transmits data related to the abnormality to an external apparatus. When the degree of abnormality derived by the abnormality analysis unit 54 is less than the above threshold value, on the other hand, the abnormality respondent unit 56 does not transmit data related to the abnormality to the external apparatus, and, in other words, suppresses transmission to the external apparatus. The external apparatus may be an apparatus external to the ECU 12, an apparatus external to the vehicle 10, or an apparatus that stores and analyzes the abnormality information on the ECU 12.

Figure 3:
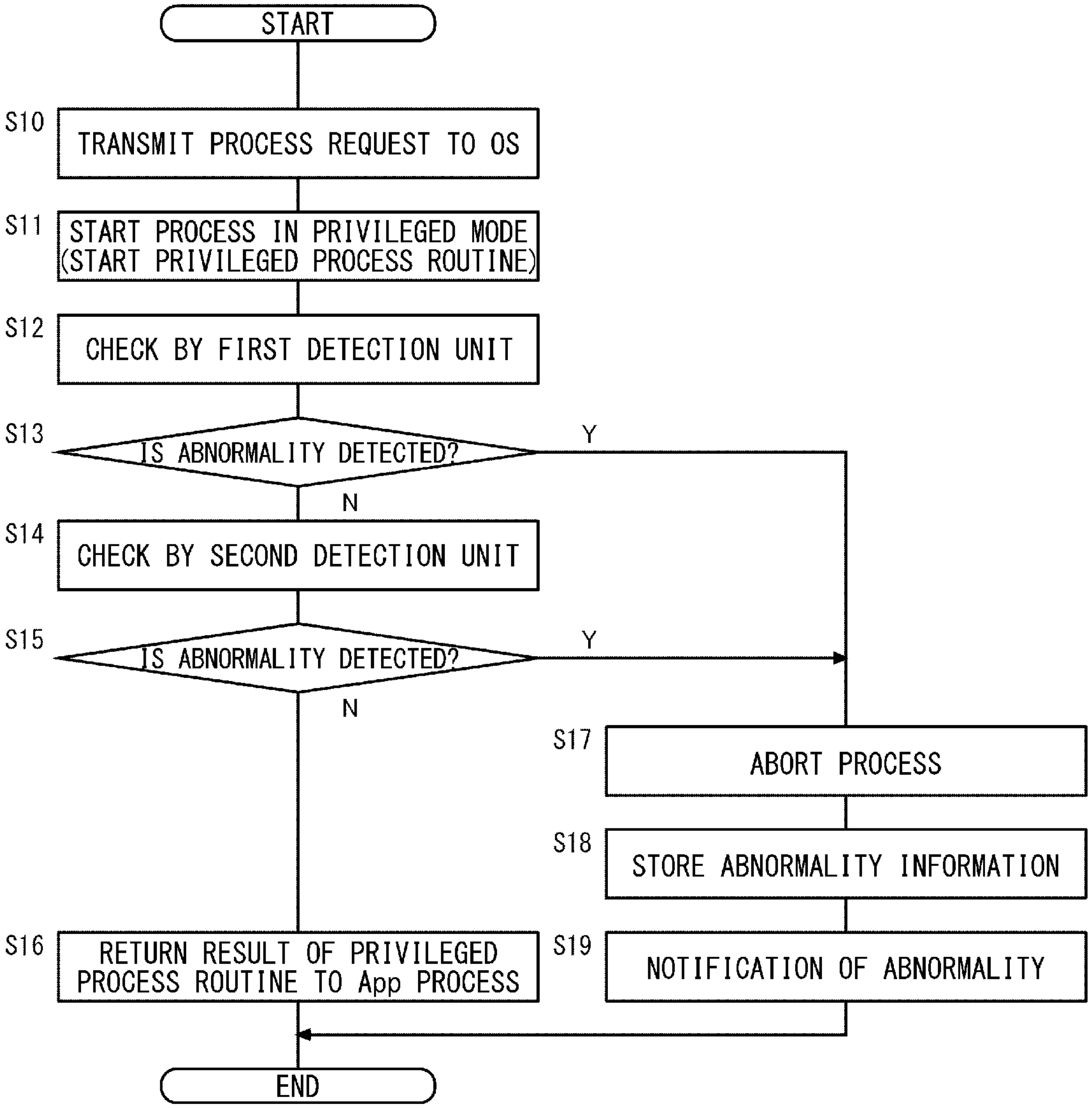
FIG. 3 is a flowchart showing the operation of the ECU (VM 16) of the exemplary embodiment.

The operation of the ECU 12 of the exemplary embodiment having the above configuration will be described. FIG. 3 is a flowchart showing the operation of the ECU 12 (VM 16) of the exemplary embodiment. The privileged process request unit 26 of the App process 22 transmits a privileged process request generated in an application process to the guest OS 20 (S10). The request reception unit 28 of the guest OS 20 receives the privileged process request, and the kernel process unit 30 starts a process (file opening, etc.) in the requested privileged mode (S11).

During the process in the privileged mode in the kernel process unit 30, the first detection unit 36 checks for an abnormality according to a StackCanary mechanism (S12). When the first detection unit 36 does not detect an abnormality (N in S13), the second detection unit 38 checks for an abnormality according to a CFI mechanism (S14). When the second detection unit 38 does not detect an abnormality (N in S15), the kernel process unit 30 returns the result of the process in the privileged mode to the requesting App process 22 (S16).

When the first detection unit 36 detects an abnormality (Y of S13) or when the second detection unit 38 detects an abnormality (Y of S15), the kernel process unit 30 executes an abort process related to the process in the privileged mode executed so far (S17). The abnormality notification unit 32 stores abnormality information related to the detected abnormality in the abnormality information storage unit 34 (S18). The abnormality notification unit 32 transmits notification information related to the detected abnormality to the VM 18 (i.e., a further VM that executes a process responsive to an abnormality) via the HV 14 (S19).

The request reception unit 28 of the guest OS 20 provides information related to the privileged process request received from the App process 22 to the statistical information acquisition unit 40, although the feature is not shown in FIG. 3. The statistical information acquisition unit 40 stores, in the abnormality information storage unit 34, statistical information (for example, the number of times of requests, request frequency, error information, error frequency, etc.) based on the privileged process request from the App process 22.

Figure 4:
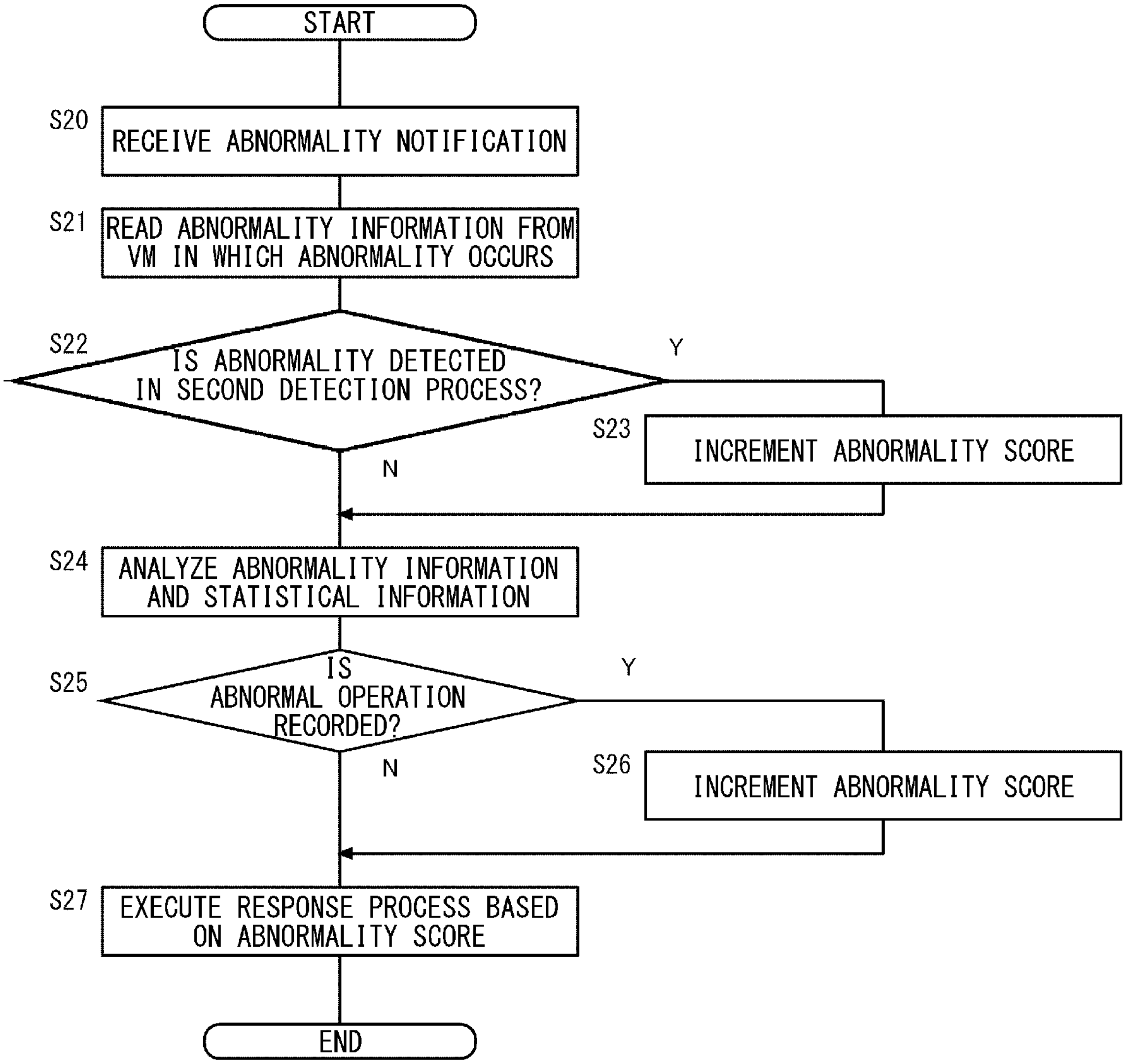
FIG. 4 is a flowchart showing the operation of the ECU (VM 18) of the exemplary embodiment.

FIG. 4 is a flowchart showing the operation of the ECU 12 (VM 18) of the exemplary embodiment. The abnormality analysis unit 54 of the App process 46 running in the VM 18 receives the notification information output from the VM 16 and transferred by the HV 14 and the guest OS 44 (S20). The abnormality analysis unit 54 reads the abnormality information from the abnormality information storage unit 34 of the VM 16 based on the notification information (S21). Further, the abnormality analysis unit 54 further reads, from the abnormality information storage unit 34 of the VM 16, statistical information related to the App process (App process 22 in the exemplary embodiment) indicated by the abnormality information as having called the OS program in which the abnormality is detected.

When the abnormality information indicates that the second detection unit 38 has detected an abnormality, i.e., when the first detection unit 36 has not detected an abnormality and the second detection unit 38 has detected an abnormality (Y in S22), the abnormality analysis unit 54 increments an abnormality score (+1 in the exemplary embodiment) (S23). The anomaly score is an index value indicating the degree of abnormality in the VM 16 (guest OS 20). When the abnormality information indicates that the first detection unit 36 has detected an abnormality (N in S22), the process in S23 is skipped. Thus, an appropriate respondent process according to the type of attack is executed by increasing the degree of abnormality when an attack that avoids abnormality detection by the first detection unit 36 is received.

The abnormality analysis unit 54 analyzes the abnormality information and the statistical information and determines whether or not an abnormal operation different from normal is recorded as an operation of the App process 22 calling the OS program (S24). When the number of times or frequency of privileged process requests from the App process 22 indicated by the statistical information is greater than a predetermined threshold, or when the number of times or frequency of privileged process requests from the App process 22 failing in a format check is greater than a predetermined threshold, for example, the abnormality analysis unit 54 may determine that an abnormal operation is recorded. When an abnormal operation of the App process 22 is recorded (Y in S25), the abnormality analysis unit 54 increments the abnormality score (+1 in the exemplary embodiment) (S26). When an abnormal operation of the App process 22 is not recorded (N in S25), the process in S26 is skipped.

It is determined that, as a result of the steps up to S26, the anomaly score is "0" when the degree of abnormality is low, "1" when the degree of abnormality is medium, and "2" when the degree of abnormality is high. The abnormality respondent unit 56 executes a process responsive to the abnormality according to the abnormality score (S27).

FIG. 5 shows the detail of a respondent process for each anomaly score. When the abnormality score is less than the first threshold value ("1" in the exemplary embodiment), i.e., when the abnormality score is "0", the abnormality respondent unit 56 restarts the App process 22 of the VM 16 that called the OS program in which the abnormality is detected. For example, the VM 18 may store a pre-generated command file including content for restarting the App process 22, and the abnormality respondent unit 56 may execute the command file. When the abnormality score is the first threshold, the abnormality respondent unit 56 does not transmit security incident data indicating that an abnormality has occurred in the guest OS 20 of the VM 16 to the external apparatus.

When the abnormality score is greater than or equal to the first threshold and less than the second threshold ("2" in the exemplary embodiment), i.e., when the abnormality score is "1", the abnormality respondent unit 56 restarts the App process 22 of the VM 16 that called the OS program in which the abnormality is detected. At the same time, the abnormality respondent unit 56 stores the abnormality information acquired from the VM 16 in a predetermined storage area (for example, a memory area for the VM 18) and transmits security incident data including the abnormality information to the external apparatus.

When the abnormality score is greater than or equal to the second threshold, i.e., when the abnormality score is "2", the abnormality respondent unit 56 aborts the App process 22 of the VM 16 that called the OS program in which the abnormality is detected, and operates the VM 16 in the fallback mode. For example, the VM 18 may store a pre-generated command file that includes content that forcibly aborts the App process 22, and the abnormality respondent unit 56 may execute the command file. At the same time, the abnormality respondent unit 56 stores the abnormality information acquired from the VM 16 in a predetermined storage area (for example, a memory area for the VM 18) and transmits security incident data including the abnormality information to the external apparatus.

In the ECU 12 of the exemplary embodiment, a VM that detects an abnormality and a VM that executes a process responsive to the abnormality are isolated (in the exemplary embodiment, the former is the VM 16 and the latter is the VM 18). This makes it possible to avoid the function that executes the process responsive to the abnormality from being attacked and to execute the process responsive to the abnormality stably. When the guest OS 20 of the VM 16 is attacked in the ECU 12, for example, the process responsive to an abnormality in a process of the guest OS 20 can be stably executed. In the ECU 12, it is also possible, by scoring the degree of abnormality at the time of abnormality detection, to select whether it is necessary to notify the external apparatus of the abnormality according to the degree of abnormality so as to, for example, suppress the frequency of or the amount of data for abnormality notification provided to the external apparatus.

The present disclosure has been described above based on an exemplary embodiment. The exemplary embodiment is intended to be illustrative only and it will be understood by those skilled in the art that various modifications to combinations of constituting elements and processes of the exemplary embodiment are possible and that such modifications are also within the scope of the present disclosure.

Figure 6:
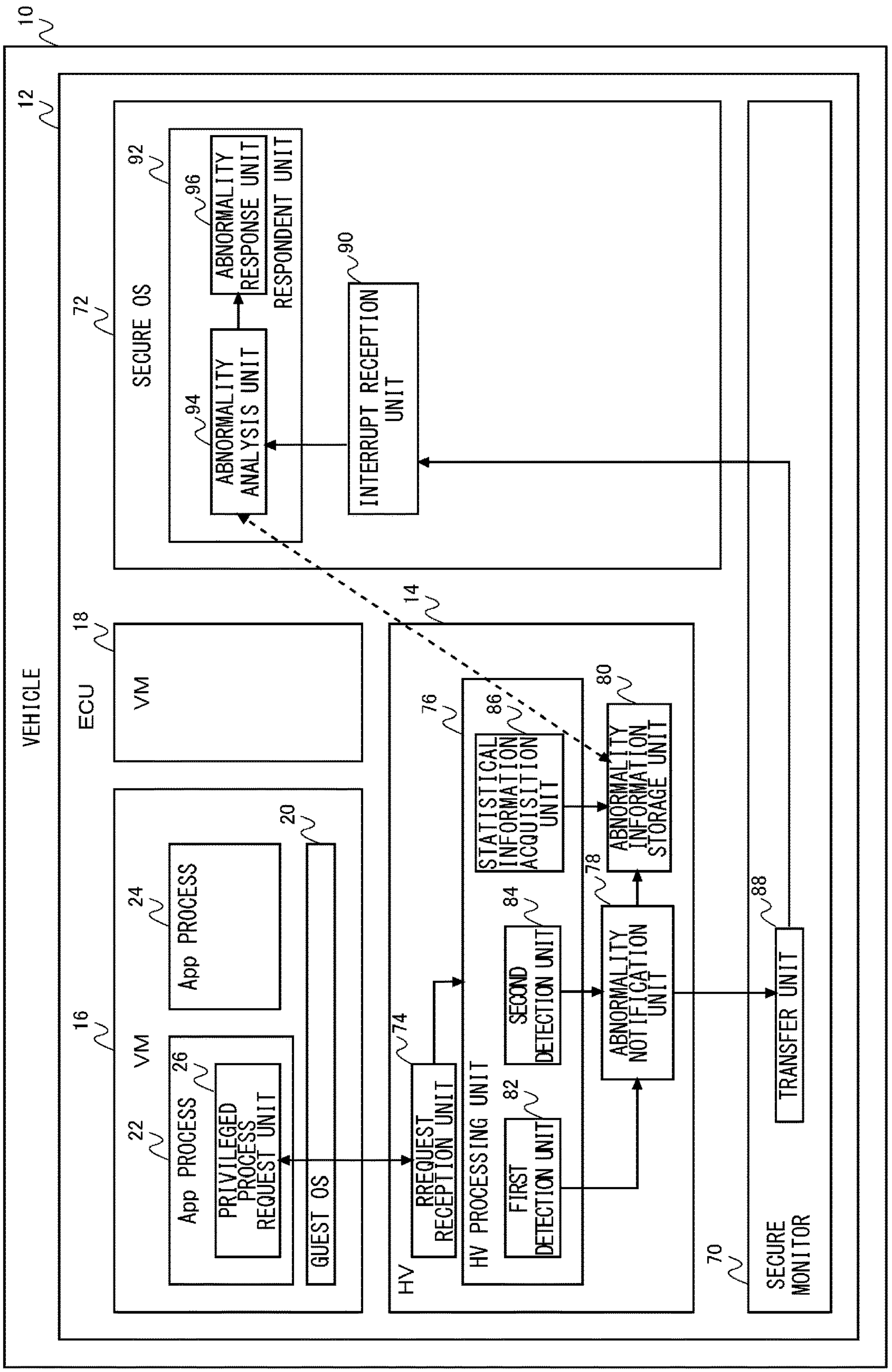
FIG. 6 is a block diagram showing functional blocks provided in the ECU of the first variation.

The first variation will be described. FIG. 6 is a block diagram showing functional blocks provided in the ECU 12 of the first variation. Of the functional blocks provided in the ECU 12 of the first variation, functional blocks identical to functional blocks provided in the ECU 12 of the exemplary embodiment are appropriately denoted by the same reference numerals as the exemplary embodiment. Hereinafter, the details already described in the exemplary embodiment will be omitted from the description, and differences from the exemplary embodiment will mainly be described.

The ECU 12 of the first variation includes a secure monitor 70, an HV 14 operating on the secure monitor 70, and a secure OS 72. Further, the ECU 12 of the first variation includes a VM 16 and a VM 18 operating on the HV 14 as in the exemplary embodiment.

The secure monitor 70 and the secure OS 72 are collectively referred to as a "secure world part". The secure world part typically executes security-related processes such as authentication. The execution environment of the HV 14, the VM 16, and the VM 18 is also called a normal world, and a process in the normal world can access a process in the secure world part only by calling an API predetermined in the secure world part. The secure world part (secure monitor 70 and secure OS 72) is an execution environment with a higher reliability than the HV 14, the VM 16, and the VM 18.

The secure monitor 70 includes a transfer unit 88. The transfer unit 88 corresponds to the transfer unit 42 of the HV 14 of the exemplary embodiment.

The HV 14 includes a request reception unit 74, an HV processing unit 76, an abnormality notification unit 78, and an abnormality information storage unit 80. The HV processing unit 76 executes various processes related to VM management. The HV processing unit 76 includes a first detection unit 82, a second detection unit 84, and a statistical information acquisition unit 86. The request reception unit 74, the abnormality notification unit 78, the abnormality information storage unit 80, the first detection unit 82, the second detection unit 84, and the statistical information acquisition unit 86 correspond to the request reception unit 28, the abnormality notification unit 32, the abnormality information storage unit 34, the first detection unit 36, the second detection unit 38, and the statistical information acquisition unit 40 provided in the guest OS 20 of the exemplary embodiment.

The secure OS 72 includes an interrupt reception unit 90 and a respondent unit 92. The interrupt reception unit 90 corresponds to the interrupt reception unit 52 provided in the VM 18 of the exemplary embodiment. The respondent unit 92 corresponds to the App process 46 provided in the VM 18 of the exemplary embodiment. The respondent unit 92 includes an abnormality analysis unit 94 and an abnormality respondent unit 96. The abnormality analysis unit 94 and the abnormality respondent unit 96 correspond to the abnormality analysis unit 54 and the abnormality respondent unit 56 provided in the App process 46 of the exemplary embodiment.

As shown in FIG. 6, the functional block related to abnormality detection provided in the guest OS 20 of the VM 16 of the exemplary embodiment is provided in the HV 14 in the first variation. The check code shown in FIG. 2B is set in the program of the HV 14 (hereinafter also referred to as "HV program") in the first variation. Further, the functional block related to abnormality respondence provided in the VM 18 of the exemplary embodiment is provided in the secure OS 72 in the first variation. The first variation is designed to deal with an abnormality in the HV 14 (in other words, an abnormality in a process of the HV program). When an abnormality in the HV 14 is detected, the VM 18 under the management of the HV 14 does not deal with the abnormality in the HV 14, but the secure OS 72 not dependent on the HV 14 deals with the abnormality in the HV 14.

For example, the first detection unit 82 and the second detection unit 84 of the HV 14 detect an abnormality in a process in the HV 14. When an abnormality is detected by the first detection unit 82 or the second detection unit 84, the abnormality notification unit 78 of the HV 14 notifies the secure OS 72 of information related to the abnormality via the secure monitor 70. The respondent unit 92 of the secure OS 72 executes a process responsive to the abnormality, based on information on the information related to the abnormality provided from the HV 14.

The operation of the ECU 12 of the first variation having the above configuration will be described. The privileged process request unit 26 of the App process 22 transmits a privileged process request generated in an application process to the guest OS 20. The guest OS 20 executes a process in the privileged mode based on the privileged process request from the App process 22, and during the execution, transmits a request for a hypervisor process (also referred to as a "hypercall") to the HV 14. The request reception unit 74 of the HV 14 receives a hypercall, and the HV processing unit 76 starts a hypervisor process based on the hypercall.

During the hypervisor process in the HV processing unit 76, the first detection unit 82 checks for an abnormality according to a StackCanary mechanism. When the first detection unit 82 does not detect an abnormality, the second detection unit 84 checks for an abnormality according to a CFI mechanism. When the second detection unit 84 does not detect an abnormality, the HV processing unit 76 returns the result of the hypervisor process to the requesting guest OS 20, and the guest OS 20 returns the result of the process in the privileged mode to the requesting App process 22.

When the first detection unit 82 detects an abnormality or the second detection unit 84 detects an abnormality, the HV processing unit 76 executes an abort process related to the hypervisor process executed so far. The abnormality notification unit 78 stores abnormality information related to the detected abnormality in the abnormality information storage unit 80. The abnormality information here includes, in addition to information related to a process in the guest OS 20 that directly called the HV program in which the abnormality is detected, information related to the App process 22 that indirectly called the HV program. The abnormality notification unit 78 transmits notification information related to the detected abnormality to the secure OS 72 via the secure monitor 70.

The request reception unit 74 of the HV 14 provides information related to the hypercall received from the guest OS 20 to the statistical information acquisition unit 86. The statistical information acquisition unit 86 stores statistical information (for example, the number of times of requests, request frequency, error information, error frequency, etc.) related to the hypercall from the guest OS 20 in the abnormality information storage unit 80.

The abnormality analysis unit 94 of the respondent unit 92 running in the secure OS 72 receives the notification information output from the HV 14 and transferred by the secure monitor 70 and the interrupt reception unit 90. The abnormality analysis unit 94 reads the abnormality information from the abnormality information storage unit 80 of the HV 14, based on the notification information. Further, the abnormality analysis unit 94 further reads, from the abnormality information storage unit of the HV 14, statistical information related to the process of the guest OS 20 or the App process 22 indicated by the abnormality information as having called the HV program in which the abnormality is detected.

The abnormality analysis unit 94 increments an abnormality score (+1) indicating the degree of abnormality in the HV 14, when the abnormality information indicates that the second detection unit 84 has detected an abnormality, i.e., when the first detection unit 82 has not detected an abnormality and the second detection unit 84 has detected an abnormality. When the abnormality information indicates that the first detection unit 82 has detected an abnormality, the process of incrementing the abnormality score is skipped.

The abnormality analysis unit 94 analyzes the abnormality information and statistical information and determines whether or not an abnormal operation different from normal is recorded as an operation of the guest OS 20 process or the App process 22 calling the HV program. When an abnormal operation of the guest OS 20 process or the App process 22 is recorded, the abnormality analysis unit 94 increments the abnormality score (+1). When an abnormal operation of the guest OS 20 process or the App process 22 is not recorded, the process of incrementing the abnormality score is skipped.

The abnormality respondent unit 96 executes a process responsive to the abnormality according to the abnormality score. When the abnormality score is less than the first threshold value (in this case, "1"), i.e., when the abnormality score is "0", the abnormality respondent unit 96 restarts the App process 22 of the VM 16 that indirectly called the HV program in which the abnormality is detected. In one variation, the abnormality respondent unit 96 may restart the VM 16 including the process of the guest OS 20 that directly called the HV program in which the abnormality is detected. The abnormality respondent unit 56 does not transmit security incident data to the external apparatus.

When the abnormality score is greater than or equal to the first threshold and less than the second threshold (in this case, "2"), i.e., when the abnormality score is "1", the abnormality respondent unit 96 restarts the App process 22 of the VM 16 that indirectly called the HV program in which the abnormality is detected. In one variation, the abnormality respondent unit 96 may restart the VM 16 including the process of the guest OS 20 that directly called the HV program in which the abnormality is detected. Further, the abnormality respondent unit 96 stores the abnormality information acquired from the HV 14 in a predetermined storage area (for example, a memory area for the secure OS 72) and transmits security incident data including the abnormality information to the external apparatus.

When the abnormality score is greater than or equal to the second threshold, i.e., when the abnormality score is "2", the abnormality respondent unit 96 aborts the App process 22 of the VM 16 that called the HV program in which the abnormality is detected, and operates the VM 16 in the fallback mode. In one variation, the abnormality respondent unit 96 may abort the VM 16 including the process of the guest OS 20 that directly called the HV program in which the abnormality is detected. Further, the abnormality respondent unit 96 stores the abnormality information acquired from the HV 14 in a predetermined storage area (for example, a memory area for the secure OS 72) and transmits security incident data including the abnormality information to the external apparatus.

When an abnormality is detected in the normal world in the ECU 12 of the first variation, the secure world unit (secure OS 72) isolated from the normal world executes the process responsive to the abnormality. This makes it possible to avoid the function that executes the process responsive to the abnormality from being attacked and to execute the process responsive to the abnormality stably. When the HV 14 is attacked, for example, the process responsive to the abnormality in the process in the HV 14 can be executed stably in the ECU 12. It is also possible, in the ECU 12, to select the necessity of abnormality notification to the external apparatus according to the degree of abnormality, by scoring the degree of abnormality at the time of abnormality detection. For example, the frequency of or the amount of data for abnormality notification to the external apparatus can be suppressed.

The second variation will be described. The ECU 12 of the second variation comprises a combination of the configuration of the ECU 12 of the exemplary embodiment shown in FIG. 1 and the configuration of the ECU 12 of the first variation shown in FIG. 6. Namely, the configuration of the ECU 12 of the second variation is derived from adding the configuration of the HV 14, the configuration of the secure monitor 70, and the configuration of the secure OS 72 shown in FIG. 6 to the configuration of the ECU 12 of the exemplary embodiment shown in FIG. 1.

In the ECU 12 of the second variation, the guest OS 20 of the VM 16 detects an abnormality in the guest OS 20, and the App process 46 (respondent unit) of the VM 18 deals with the abnormality in the guest OS 20. Stated otherwise, an abnormality in the OS on a given VM is dealt with by a further VM. In further accordance with the ECU 12 of the second variation, the HV 14 detects an abnormality in the HV 14, and the secure OS 72 deals with the abnormality in the HV 14.

In the second variation, the abnormality respondent unit 56 of the VM 18 transmits the abnormality information and the statistical information related to the abnormality in the guest OS 20 acquired from the abnormality information storage unit 34 of the VM 16 to the secure OS 72 (abnormality analysis unit 94) via the secure monitor 70 (transfer unit 88). The abnormality analysis unit 94 of the secure OS 72 stores abnormality information and statistical information related to the abnormality of the guest OS 20 transmitted from the abnormality respondent unit 56 of the VM 18 in a predetermined storage area (for example, a storage area for the secure OS 72).

In addition to the abnormality information and the statistical information related to the abnormality in the HV 14 acquired from the abnormality information storage unit 80 of the HV 14, the abnormality analysis unit 94 of the secure OS 72 derives an abnormality score related to the abnormality in the HV 14, based on the abnormality information and the statistical information related to the abnormality in the guest OS 20 transmitted from the abnormality respondent unit 56 of the VM 18. For example, as described in the first variation, the abnormality analysis unit 94 may increment the abnormality score based on the abnormality information and the statistical information related to the abnormality in the HV 14, and also, as described in the exemplary embodiment, increment the abnormality score based on the abnormality information and the statistical information related to the abnormality in the guest OS 20. The abnormality respondent unit 96 may execute the process responsive to abnormality to further enhance the safety of the ECU 12 as the abnormality score increases.

The ECU 12 of the second modification provides both the benefit provided by the ECU 12 of the exemplary embodiment and the benefit provided by the ECU 12 of the first variation. In further accordance with the second variation, it is possible to realize the ECU 12 capable of dealing with both an attack against the guest OS 20 of the VM 16 (abnormality in the guest OS 20) and an attack against the HV 14 (abnormality in the HV 14).

A third variation will be described. In the exemplary embodiment described above, the abnormality notification unit 32 of the VM 16 transmits notification information indicating the storage position of the abnormality information to the VM 18, and the abnormality analysis unit 54 of the VM 18 reads the abnormality information from the VM 16 based on the storage position indicated by the notification information. In one variation, the abnormality notification unit 32 of the VM 16 may transmit the abnormality information itself to the VM 18 instead of the notification information. In a combination with the first variation, the abnormality notification unit 78 of the HV 14 may transmit the abnormality information itself to the secure OS 72 instead of the notification information.

A fourth variation will be described. The abnormality information may include data (for example, an executable file) for the OS program of the guest OS 20 in which the abnormality is detected. Further, the VM 18 (abnormality analysis unit 54) may store a pre-generated hash value of the regular OS program of the guest OS 20. The abnormality analysis unit 54 of the VM 18 may generate a hash value of the data for the OS program data included in the abnormality information and compare the generated hash value with the hash value of the regular OS program stored in advance. The abnormality respondent unit 56 of the VM 18 may transmit security incident data including a result of checking the hash values (data indicating a match or mismatch) to the external apparatus. This makes it possible to detect an incidence of the OS program of the guest OS 20 being rewritten by an attack and notify the external apparatus of the incident. In a combination with the first variation, the abnormality analysis unit 94 and the abnormality respondent unit 96 of the secure OS 72 may execute these processes.

A fifth variation will be described. The abnormality respondent unit 56 may append an electronic signature defined by secret information associated with the App process 46 (respondent unit) to the security incident data transmitted to the external apparatus. This makes it possible to prevent spoofing by a third party and falsification of security incident data. The secret information associated with the App process 46 (respondent unit) may be a secret key assigned in advance to the App process 46, the abnormality analysis unit 54, or the abnormality respondent unit 56.

A sixth variation will be described. The abnormality respondent unit 56 may abort the VM 16 in cooperation with the HV 14, i.e., may abort the App process 22, the App process 24, and the guest OS 20 in response to the abnormality in the guest OS 20 of the VM 16. The abnormality respondent unit 56 may abort the VM 16 when the abnormality score is high, i.e., when the abnormality is serious. For example, when the anomaly score is less than the first threshold value, the abnormality respondent unit 56 may restart the App process 22 and not report. When the anomaly score is greater than or equal to the first threshold value and less than the second threshold value, the abnormality respondent unit 56 may abort the App process 22 and report. When the abnormality is greater than or equal to the second threshold value, the abnormality respondent unit 56 may abort the VM 16 and report. Further, when it is detected that the OS program of the guest OS 20 has been rewritten by finding a mismatch of the hash values as described in the fourth variation, the abnormality respondent unit 56 may determine that the abnormality is serious and abort the VM 16 regardless of the abnormality score.

In a combination with the first variation, the abnormality respondent unit 96 may abort the HV 14 in response to the abnormality in the HV 14. For example, the abnormality respondent unit 96 may restart the App process 22 when the abnormality score is low, abort the App process 22 when the abnormality score is medium, abort the VM 16 when the abnormality score is high, and abort the HV 14 when the abnormality score is extremely high.

Any combination of the exemplary embodiment and the variation described above will also be useful as an embodiment of the present disclosure. New embodiments created by the combination provide the advantages of exemplary embodiment and the variation combined. It will also be understood by skilled persons that the functions that the constituting elements recited in the claims should achieve are implemented either alone or in combination by the constituting elements shown in the exemplary embodiment and the variations.

The technologies according to the embodiment and variations may be defined by the following items.

[Item 1] An information processing apparatus in which a first VM (Virtual Machine) and a second VM operate on a HV (HyperVisor), wherein the first VM includes: a detection unit that detects an abnormality in a process in the first VM; and a notification unit that, when the detection unit detects an abnormality, notifies the second VM of information related to the abnormality via the HV, and the second VM includes: a respondent unit that executes a process responsive to the abnormality, based on the information related to the abnormality provided from the first VM. According to this information processing apparatus, it is therefore possible, by isolating the VM that detects an abnormality from the VM that executes a process responsive to the abnormality, to avoid the function that executes a process responsive to the abnormality from being attacked and to execute the process responsive to the abnormality stably.

[Item 2] The information processing apparatus according to item 1, wherein the detection unit and the notification unit are provided in an OS (Operating System) operating on the first VM, the detection detects an abnormality in a process of the OS, and the respondent unit executes a process responsive to the abnormality, based on information related to the abnormality in the process of the OS acquired from the first VM. According to this information processing apparatus, when the OS on the first VM is attacked, the process responsive to an abnormality in a process of the OS can be stably executed.

[Item 3] The information processing apparatus according to item 2, wherein the respondent unit derives a degree of abnormality based on the information related to the abnormality in the process of the OS, restarts a process of an application requesting the process of the OS when the degree of abnormality is less than a predetermined threshold value, and aborts the process of the application when the degree of abnormality is greater than or equal to the predetermined threshold value. According to this information processing apparatus, it is possible to secure the safety of a host apparatus in accordance with a degree of abnormality.

[Item 4] The information processing apparatus according to any one of items 1 through 3, wherein the respondent unit derives a degree of abnormality based on the information related to the abnormality provided from the first VM, transmits data related to the abnormality to an external apparatus when the degree of abnormality is greater than or equal to a predetermined threshold value, and does not transmit the data related to the abnormality to the external apparatus when the degree of abnormality is less than the predetermined threshold value. According to this information processing apparatus, it is possible to reduce the amount of data transmitted to an external apparatus, i.e., to suppress excessive data transmission to an external apparatus.

[Item 5] The information processing apparatus according to item 3 or 4, wherein the detection unit includes a first detection unit and a second detection unit that differ in a method to detect an abnormality, the second detection unit executes an abnormality detection process after an abnormality detection process by the first detection unit, and when the second detection unit detects an abnormality but the first detection unit does not detect an abnormality, the respondent unit increases the degree of abnormality. According to this information processing apparatus, it is possible to execute an appropriate process responsive to the type of attack, by increasing the degree of abnormality when an attack to avoid abnormality detection by the first detection unit is received.

[Item 6] An information processing apparatus in which a HV and a secure OS operate on a secure monitor, and one or more VMs operate on the HV, wherein the HV includes: a detection unit that detects an abnormality in a process in the HV; and a notification unit that, when the detection unit detects an abnormality, notifies the secure OS of information related to the abnormality via the secure monitor, and the secure OS includes: a respondent unit that executes a process responsive to the abnormality, based on the information related to the abnormality provided from the HV. According to this information processing apparatus, it is possible to avoid the function that executes a process responsive to the abnormality from being attacked and to execute the process responsive to the abnormality stably, by isolating the entity detecting an abnormality from the entity executing a process responsive to the abnormality (the former is the HV, and the latter is the secure OS).

[Item 7] An information processing method executed by a computer in which a first VM and a second VM operate on a HV, including: detecting, using the first VM, an abnormality in a process in the first VM, and notifying, when an abnormality is detected, the second VM of information related to the abnormality via the HV, and executing, using the second VM, a process responsive to the abnormality, based on the information related to the abnormality provided from the first VM. According to this information processing method, it is possible to avoid the function that executes a process responsive to the abnormality from being attacked and to execute the process responsive to the abnormality stably, by isolating the VM detecting an abnormality from the VM executing a process responsive to the abnormality.

[Item 8] An information processing method executed by a computer in which a HV and a secure OS operate on a secure monitor, and one or more VMs operate on the HV, including: detecting, using the HV, an abnormality in a process in the HV, and notifying, when an abnormality is detected, the secure OS of information related to the abnormality via the secure monitor, and executing, using the secure OS, a process responsive to the abnormality, based on the information related to the abnormality provided from the HV. According to this information processing method, it is possible to avoid the function that executes a process responsive to the abnormality from being attacked and to execute the process responsive to the abnormality stably, by isolating the entity detecting an abnormality from the entity executing a process responsive to the abnormality (the former is the HV, and the latter is the secure OS).

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2021-029959, filed on Feb. 26, 2021, the entire contents of which are incorporated herein by reference.

What is claimed is:

1. An information processing apparatus, comprising:
 a processor; and
 a memory including a program that, when executed by the processor, causes a first Virtual Machine (VM) and a second VM to operate on a Hyper Visor (HV), wherein
 the first VM includes:
  a detection process that detects an abnormality in a first process in the first VM; and
  a notification process that, when the detection process detects the abnormality, notifies the second VM of information related to the abnormality via the HV,
 the second VM includes:
  a respondent process that executes a second process responsive to the abnormality, based on the information related to the abnormality provided from the first VM,
 the respondent process derives a degree of abnormality based on the information related to the abnormality provided from the first VM, and executes the second process responsive to the abnormality when the degree of abnormality is greater than or equal to a predetermined threshold value,
 the detection process includes a first detection process and a second detection process that differ in a method of detecting the abnormality,
 the second detection process executes a second abnormality detection process after a first abnormality detection process is executed by the first detection process, and
 when the second detection process detects the abnormality, the respondent process, on condition that a detection result of the first detection process indicates that no abnormality was detected, determines that the abnormality avoided detection by the first detection process and increases the degree of abnormality.

2. The information processing apparatus according to claim 1, wherein
 the detection process and the notification process are provided in an Operating System (OS) operating on the first VM,
 the detection process detects the abnormality in the first process of the OS, and
 the respondent process executes the second process responsive to the abnormality, based on the information related to the abnormality in the first process of the OS provided from the first VM.

3. The information processing apparatus according to claim 2, wherein
 the respondent process derives the degree of abnormality based on the information related to the abnormality in the first process in the OS, restarts a third process in an application requesting the first process in the OS when the degree of abnormality is less than a predetermined threshold value, and aborts the third process in the application when the degree of abnormality is greater than or equal to the predetermined threshold value.

4. The information processing apparatus according to claim 1, wherein
 the respondent process derives the degree of abnormality based on the information related to the abnormality provided from the first VM, transmits data related to the abnormality to an external apparatus when the degree of abnormality is greater than or equal to a predetermined threshold value, and does not transmit the data related to the abnormality to the external apparatus when the degree of abnormality is less than the predetermined threshold value.

5. The information processing apparatus according to claim 4, wherein when the second detection process detects the abnormality but the first detection process does not detect an abnormality, the respondent process increases the degree of abnormality.

6. An information processing apparatus, comprising:

a processor; and a memory including a program that, when executed by the processor, causes a Hyper Visor (HV) and a secure Operating System (OS) to operate on a secure monitor, and at least one Virtual Machine (VM) to operate on the HV, wherein the HV includes:

a detection process that detects an abnormality in a first process in the HV; and a notification process that, when the detection process detects the abnormality, notifies the secure OS of information related to the abnormality via the secure monitor, and the secure OS includes:

a respondent process that executes a second process responsive to the abnormality, based on the information related to the abnormality provided from the HV, the respondent process derives a degree of abnormality based on the information related to the abnormality provided from the HV, and executes the second process responsive to the abnormality when the degree of abnormality is greater than or equal to a predetermined threshold value, the detection process includes a first detection process and a second detection process that differ in a method of detecting the abnormality, the second detection process executes a second abnormality detection process after a first abnormality detection process is executed by the first detection process, and when the second detection process detects the abnormality, the respondent process, on condition that a detection result of the first detection process indicates that no abnormality was detected, determines that the abnormality avoided detection by the first detection process and increases the degree of abnormality.

7. An information processing method executed by a computer in which a HyperVisor (HV) and a secure Operating System (OS) operate on a secure monitor, and at least one Virtual Machine (VM) operates on the HV, the information processing method comprising:

detecting, using the HV, an abnormality in a first process in the HV, and notifying, when the abnormality is detected, the secure OS of information related to the abnormality via the secure monitor, and executing, using the secure OS, a second process responsive to the abnormality, based on the information related to the abnormality provided from the HV, wherein the executing of the second process responsive to the abnormality includes:

deriving a degree of abnormality based on the information related to the abnormality provided from the HV, and executing the second process responsive to the abnormality when the degree of abnormality is greater than or equal to a predetermined threshold value, the detecting of the abnormality includes:

detecting the abnormality using a first detection process and a second detection process that differ in a method of detecting the abnormality, the second detection process being executed after the first detection process, and the deriving of the degree of abnormality includes:

when the abnormality is detected by the second detection process, on condition that the abnormality was not detected by the first detection process, determining that the abnormality avoided detection by the first detection process and increasing the degree of abnormality.

* * * * *